United States Patent [19]

Small

[11] 4,234,801

[45] Nov. 18, 1980

[54] CONTROL SYSTEM UTILIZING MOMENTARY SWITCHING DEVICES

[75] Inventor: James E. Small, Indianapolis, Ind.

[73] Assignee: Emhart Industries, Inc., Indianapolis, Ind.

[21] Appl. No.: 880,089

[22] Filed: Feb. 22, 1978

[51] Int. Cl.³ .............................................. H02J 3/00
[52] U.S. Cl. .................................... 307/38; 307/115; 361/193
[58] Field of Search ................ 307/139, 140, 141, 31, 307/38, 40, 112, 113, 115; 340/309.4, 309.1, 147 P; 361/189, 191–193

[56] References Cited

U.S. PATENT DOCUMENTS

| | | | |
|---|---|---|---|
| 2,870,348 | 1/1959 | Chao | 361/193 |
| 3,819,906 | 6/1974 | Gould | 307/141 |
| 4,137,463 | 1/1979 | Scott | 307/141 |

Primary Examiner—Richard A. Wintercorn
Assistant Examiner—S. D. Schreyer
Attorney, Agent, or Firm—Robert F. Meyer; David W. Gomes

[57] ABSTRACT

A control system is disclosed which is capable of controlling N+1 operational modes of a plurality of machine functions of an apparatus utilizing N momentary switching devices in a specific logical interrelationship. The control system includes gate circuit means which is responsive to the N switching devices for latching the control system in at least N+1 operational modes whereby the machine functions are activated and deactivated in accordance with one of a plurality of predetermined operational sequences associated with the operational modes. The N switching devices operate independent of each other yet are interrelated by the gate circuit means to limit the maximum AC line current used by the machine functions during any one of the N+1 operational modes.

5 Claims, 2 Drawing Figures

CONTROL SYSTEM UTILIZING MOMENTARY SWITCHING DEVICES

BACKGROUND OF THE INVENTION

1. Field of the Invention

The present invention relates to systems for controlling operational modes of an apparatus having a plurality machine functions which utilizes momentary switching devices for programming desired operational modes having predetermined operational sequences for activation and deactivation of the machine functions.

Generally speaking, the control system of the present invention is capable of controlling the machine functions of an apparatus by utilizing N momentary switching devices and includes gate circuit means which is responsive to the N momentary switching devices for latching the control system in at least N+1 operational modes whereby the machine functions are activated and deactivated in accordance with one of a plurality of predetermined operational sequences associated with the operational modes.

2. Description of the Prior Art

Control systems for controlling operational modes of an apparatus having a plurality of machine functions which utilize momentary switching devices for programming a desired mode having a predetermined operational sequence for activation and deactivation of the machine functions are well known in the art. However, for each of these prior art control systems the number of operational modes desired to be controlled requires at least the same number of momentary switching devices to program each operational mode. Accordingly, in order to control N operational modes of a plurality of machine functions the conventional control system would include at least N momentary switching devices each associated with one of the N operational modes.

In many applications of a control system to an apparatus having a plurality of machine functions it may be desirable to control N operational modes of the apparatus utilizing a minimum of momentary switching devices to reduce cost and/or to allow at least one machine function to operate continuously in one or more operational modes of the apparatus and to be deactivated during one or more other operational modes of the apparatus. By a specific logical interrelationship between N switches the present invention provides the capability to control at least N+1 operational modes of an apparatus having a plurality of machine functions.

SUMMARY OF THE INVENTION

In accordance with the present invention in its broadest concept, there is provided a control system for controlling at least N+1 operational modes of an apparatus having a plurality of machine functions which utilizes N momentary switching devices. The control system includes gate circuit means responsive to the N momentary switching devices for latching the control system in the N+1 operational modes whereby the machine functions are activated and deactivated in accordance with one of a plurality of predetermined operational sequences associated with the operational modes.

Accordingly, it is a feature of the present invention to provide a control system for controlling an apparatus having a plurality of machine functions which includes programming means having N momentary switching devices for programming desired operational modes for the apparatus and gate circuit means responsive to the N momentary switching devices for latching the control system in at least N+1 operational modes whereby the machine functions are activated and deactivated in accordance with a plurality of predetermined operational sequences associated with the operational modes.

It is yet another feature of the present invention to provide in an apparatus having a plurality of machine functions and a control system for controlling activation and deactivation of the machine functions in accordance with predetermined operational sequences an improved control system as described hereinabove.

It is still another feature of the present invention to provide a control system as described hereinabove wherein the N momentary switching devices each operate independently but are interrelated by the gate circuit means to limit the maximum current required by the machine functions for any one of the N+1 operational modes.

It is another feature of the present invention to provide a control system as described hereinabove which further includes function control means responsive to the gate circuit means for activating and deactivating the machine functions in accordance with the predetermined operational sequence associated with a programmed operational mode and timing means responsive to the function control means for determining timing cycles for at least two of the N+1 operational modes.

Other features and advantages of the present invention will be apparent from the following detailed description of a preferred embodiment thereof which description should be considered in conjunction with the accompanying drawings.

DESCRIPTION OF THE PREFERRED EMBODIMENT

Figure 1:
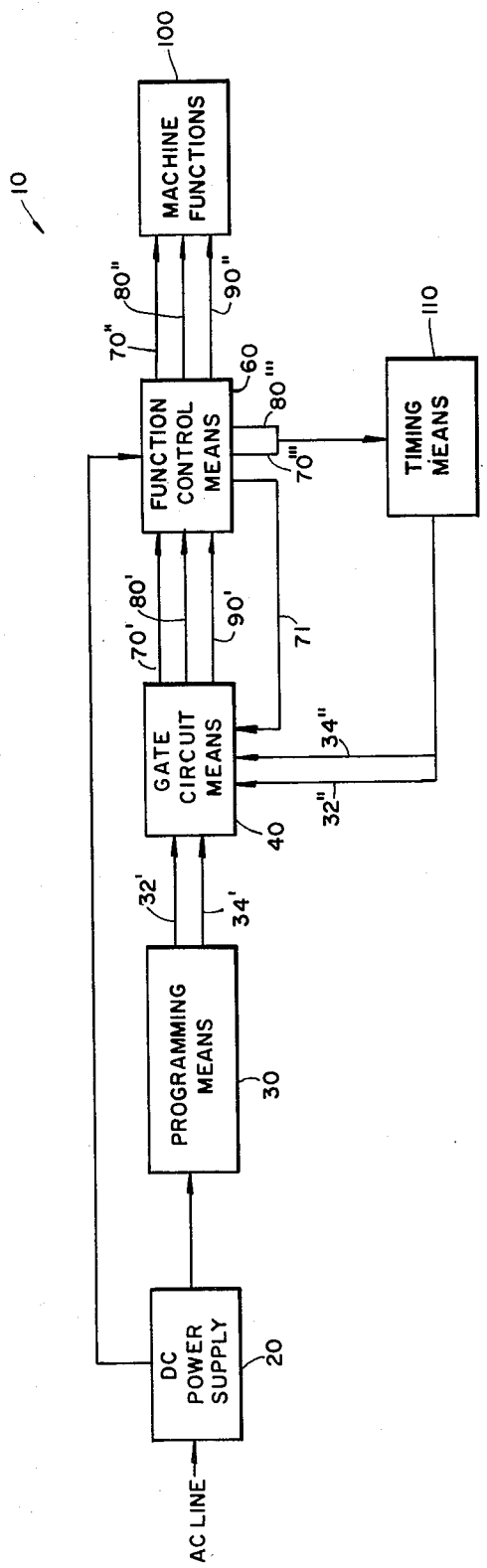
FIG. 1 is a schematic block diagram of a control system constructed in accordance with the present invention.

Illustrated in FIG. 1 is a schematic block diagram of a control system 10 for controlling an apparatus having a plurality of machine functions 100 which shows functionally the relationship of the various elements of the control system 10 as it is constructed in accordance with the present invention. As shown, control system 10 includes a DC power supply 20 which is directly responsive to an alternating signal supplied by an AC line, a programming means 30 responsive to the DC power supply having two outputs 32' and 34', a gate circuit means 40 responsive to the two outputs 32' and 34' of programming means 30, the gate circuit means 40 itself having three outputs 70', 80' and 90', a function control means 60 responsive to the DC power supply 20 and each of the three outputs 70', 80', and 90' of gate circuit means 40, the function control means 60 itself having three outputs 70", 80", and 90" to which the machine functions 100 are responsive and three other outputs 70''', 80''' and 71, and a timing means 110 responsive to the two outputs 70''' and 80''' of function control means 60, the timing means 110 itself having two outputs 32" and 34". As is further illustrated in the schematic block diagram of FIG. 1, gate circuit means 40 is responsive to the two outputs 32" and 34" of timing means 110 and also to the output 71 of function control means 60.

As will be further explained hereinafter in reference to FIG. 2, the outputs 32' and 34' of programming means 30 and the outputs 32" and 34" of timing means which are shown in FIG. 1 are representative of functions associated with N momentary switching devices (not shown in FIG. 1) included within programming means 30 (In the preferred embodiment N=2). Also the outputs 70', 80' and 90' of gate circuit means 40 and the outputs 70", 80", 90", 70'" and 80'" of function control means 60 which are shown in FIG. 1 are representative of N+1 operational modes for which the apparatus including control system 10 may be programmed to operate by utilizing the N momentary switching devices of programming means 30 (In the preferred embodiment N+1=3). The output 71 of function control means 60 as shown in FIG. 1 is representative of a function of a means for assuring that at least one of the machine functions 100 is operative during at least two of the N+1 operational modes.

Figure 2:
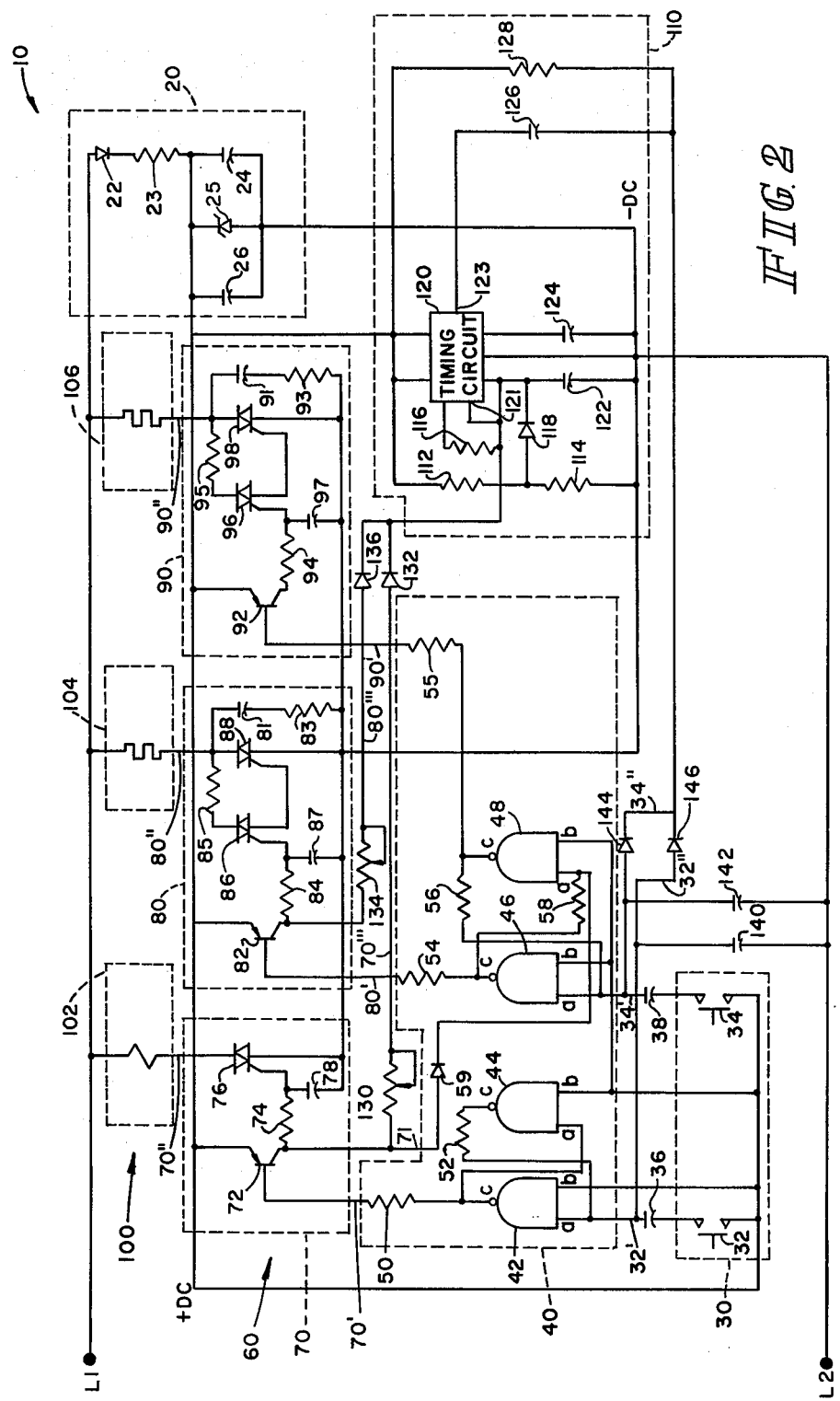
FIG. 2 is a schematic wiring diagram of a preferred embodiment of the control system shown in FIG. 1.

Referring now to FIG. 2 there is illustrated a preferred embodiment of my invention which has been presented in an electrical schematic form using conventional symbols for known component elements. For the purpose of disclosing my invention, the preferred embodiment will be described with respect to its adaptation to an apparatus having three machine functions 102, 104, and 106 each having a separate function control means 70, 80, and 90 associated therewith respectively. Furthermore, programming means 30 preferrably includes two momentary switching devices 32 and 34 and the control system has the capability of controlling operational sequences of the three machine functions 102, 104, and 106 in three operational modes. It will; however, be understood by those skilled in the art after reading the description of my invention provided hereinafter that it may be adapted to control an apparatus having more than three machine functions, to include more than two momentary switching devices, and to control operational sequences of the machine functions in more than three operational modes where there is always one more operational mode being controlled than momentary switching devices.

Referring to FIG. 2, the various elements of the preferred embodiment of the control system 10 illustrated in FIG. 1 will be in more detail. A conventional DC power supply 20 for rectifying and filtering an alternating signal of the AC line represented by terminals L1 and L2 and for regulating the magnitude of the DC voltage waveform produced thereby includes a diode 22 and a resistor 23 electrically coupled in series with the parallel combination of two capacitors 24 and 26 and a zener diode 25.

Programming means 30 for programming three operational modes of the apparatus includes two (2) momentary switching devices 32 and 34 each of which are electrically coupled in parallel to the positive side (+DC) of the DC power supply 20 and more particularly to the regulated DC voltage waveform produced by the DC power supply 20. Each momentary switching device 32 and 34 must be capable of operating independently of the other and may include any type of momentary switching device, i.e. electronic touch control switches which when activated do not latch but provide a momentary signal.

In the preferred embodiment of control system 10 illustrated in FIG. 2 gate circuit means 40 for latching the control system 10 in three different operational modes whereby the machine functions 102, 104, and 106 of the apparatus are activated and deactivated in accordance with three different predetermined operational sequences associated with the three operational modes includes four multiple input inverting logic gates. In the preferred embodiment of gate circuit means 40 these inverting logic gates are NAND gates 42, 44, 46, and 48 each having an a and b input and an output c. The a inputs of NAND gates 42 and 46 are each electrically coupled to a momentary switching device 32 and 34 through a capacitor 36 and 38 respectively whereby as long as neither momentary switching device 32 nor 34 is activated a logical zero (0) appears at these a inputs. These a inputs of NANd gates 42 and 46 are further electrically coupled to the outputs c of NAND gates 44 and 48 through resistors 52 and 56 respectively. The b inputs of each NAND gate 42, 44, 46 and 48 are all electrically coupled to the positive side (+DC) of the DC power supply 20 whereby during the operation of the apparatus a logical one (1) continuously appears at these b inputs. The a input of NAND gate 44 is electrically coupled to the output c of NAND gate 42 such that a change in the logical state of the output c of NAND gate 42 resulting from the actuation of switching device 32 likewise results in a change in the logical state of the output c of NAND gate 44. The a input of NAND gate 48 is electrically coupled to the output c of NAND gate 46 through a resistor 58 such that a change in the logical state of the output c of NAND gate 46 resulting from the actuation of switching device 34 likewise results in a change in the logical state of the output c of NAND gate 48. The a input of NAND gate 48 is further electrically coupled to an output of function control means 70 associated with machine function 102 through a diode 59 and is responsive to the logical state of the output c of NAND gate 42 such that when function control means 70 activates machine function 102 a logical one (1) appears at the a input of NAND gate 48. The electrical coupling of the four NAND gates 42, 44, 46, and 48 in the manner described hereinabove results in the formation of two bistable multivibrators or flip-flops one of which consists of NAND gates 42 and 44 and the other of which consists of NAND gates 46 and 48. Each bistable multivibrator latches the control system 10 in one operational mode when neither of the switching devices 32 and 34 are activated and each also latches the control system 10 in two other operational modes when either switching device 32 or 34 is actuated.

The outputs c of NAND gates 42, 46, and 48 in addition to being electrically coupled as described above are also each electrically coupled to a function control means 70, 80, and 90 respectively through a resistor 50, 54, and 55 respectively such that machine function 102 is activated and deactivated in accordance with the logical state of the output c of NAND gate 42, machine function 104 is activated and deactivated in accordance with the logical state of the output c of NAND gate 46, and machine function 106 is ativated and deactivated in accordance with the logical state of the output c of NAND gate 48. In order for the function control means 70, 80, or 90 to activate a machine function 102, 104, or 106 the logical state of the appropriate output c of NAND gates 42, 46, or 48 respectively must be a logical zero (0). Accordingly, a logical one (1) state of the outputs c of NAND gates 42, 46, or 48 will result in either no activation or deactivation of the corresponding machine function 102, 104, or 106 responsive to such output c.

For purposes of protecting the two bistable multivibrators from untimely changes in their output c states due to transient signals, two capacitors 140 and 142 have been electrically coupled to the a inputs of NAND gates 42 and 46 and to terminal L2 of the AC line thereby establishing low impedance paths for any such transient signals.

Continuing to refer to FIG. 2, function control means 70, 80, and 90 for activating and deactivating the machine functions 102, 104, and 106 respectively in accordance with the predetermined operational sequences set by gate circuit means 40 which are associated with each of the three operational modes may include any conventional circuitry appropriate for activating and deactivating the machine functions 100. Accordingly, it is not essential to my invention that function control means 70, 80, and 90 include any particular circuitry. As shown in the preferred embodiment of control system 10 function control means 70, 80, and 90 each includes a PNP transistor 72, 82, and 92 respectively having its base electrically coupled to an output c of NAND gates 42, 46, and 48 respectively whereby in response to a logical zero (0) state of these outputs c the corresponding transistor 72, 82, or 92 is activated. Each of the transistors 72, 82, and 92 has its emitter electrically coupled to the positive side (+DC) of the DC power supply 20 and its collector electrically coupled to machine functions 102, 104 and 106 respectively through various resistors 74, 83, 84, 85, 93, 94, and 95; various bidirectional semiconductor switching devices 76, 86, 88, 96, and 98; and various capacitors 78, 81, 87, 91, and 97 all of which as shown are electrically coupled to each other and to machine functions 102, 104, and 106 in circuit configurations which are well known in the art. Furthermore, the collectors of transistors 72 and 82 are electrically coupled through variable resistors 130 and 134 and diodes 132 and 136 respectively to the input of timing means 110 whereby timing cycles are determined for the operation of machine functions 102 and 104. It should therefore be noted that machine function 106 operates continuously (untimed) as long as the output c of NAND gate 48 is a logical zero (0) and will only be nonoperative for a time when the output c of NAND gate 48 is a logical one (1).

Timing means 110 includes a timing circuit 120 which in the preferred embodiment is an integrated timing circuit package of the type manufactured by Motorola Semiconductor Products, Inc. and identified by the number MC1555. As shown, timing 120 is electrically coupled to various resistors 112, 114, 116 and 128; various capacitors 122, 124 and 126; and a diode 118 in a manner well known in the art such that timing circuit 120 operates in a monostable (one-shot) mode. Capacitor 122 and either resistor 130 or 134 serve to establish RC time constants for the timing circuit 120. While the timing cycles themselves determined by timing means 110 are dependent upon the electrical components which are external to the timing circuit 120, timing circuit 120 provides the starting circuit, voltage comparison and other functions needed for a complete timing means 110. When the input 121 of timing circuit 120 is below ⅓ the DC regulated voltage of DC power supply 20 the output 123 of timing circuit 122 is driven to a state of logical one (1). This condition allows capacitor 122 to charge at a rate set by the RC time constant associated with either capacitor 122 and resistor 130 or 134 depending upon which machine function is activated. When the capacitor 122 voltage reaches ⅔ the DC regulated voltage of DC power supply 20 the capacitor 122 is discharged through resistor 116 and the output 123 of timing circuit 120 is driven to a state of logical zero (0). Accordingly, until capacitor 122 has charged to ⅔ the DC regulated voltage of DC power supply 20 the output 123 of timing circuit 120 and therefore of timing means 110 will be logical one (1) at which time the output 123 will make a transition to a logical zero (0) state. The time required for this logical one (1) to logical zero (0) transition to occur will be determined by the RC time constant derived from capacitor 122 and either resistor 130 or 134. The output of timing means 110 (which is also the output 123 of timing circuit 123) is electrically coupled to the a inputs of NAND gates 42 and 46 through diodes 146 and 144 respectively whereby the logical state of the outputs c of NAND gates 42 and 46 are responsive to the logical state of the output 123 of timing circuit 120 in addition to being responsive to the actuated and unactuated states of momentary switching devices 32 and 34.

Having described in detail the physical aspects of a preferred embodiment of control system 10, its operation will now generally be described. The theory of operation hereinafter described is that which is at present believed properly applicable to the embodiment described above, but it is not intended to be limiting in nature. Referring to both FIGS. 1 and 2, the operation of control system 10 can best be described by describing its operation in the three diferent operational modes indicated hereinabove.

A first operational mode of the control system 10 is programmed when neither momentary switching device 32 or 34 is actuated. In this unactuated state of momentary switching devices 32 and 34 a logical zero (0) appears at the a inputs of NAND gates 42 and 46. Since the b inputs of NAND gates 42 and 46 are electrically coupled to the positive side (+DC) of the DC power supply 20, a logical one (1) appears at these b inputs. Accordingly, the outputs c of NAND gates 42 and 46 are each logical one (1). These logical one (1) signals of outputs c of NAND gates 42 and 46 are transmitted to the a inputs of NAND gates 44 and 48 respectively. Since the b inputs of NAND gates 44 and 48 are also electrically coupled to the positive side (+DC) of the DC power supply 20, the outputs c of NAND gates 44 and 48 will be logical zero (0). These logical zero (0) outputs c of NAND gates 44 and 48 are transmitted back to the a inputs of NAND gates 42 and 46 whereby gate circuit means 40 latches control system 10 a mode of operation. Since the output c of NAND gate 48 is electrically coupled to the base of transistor 92, the logical zero (0) output c will activate transistor 92 and function control means 90 will thereby activate machine function 106. Accordingly, as can be seen, upon electrically coupling the AC line to terminals L1 and L2, machine function 106 will be activated and operate continuously representing one operational mode of the apparatus being controlled by control system 10.

A second operational mode of control system 10 is programmed when momentary switching device 32 is actuated. Upon activation of momentary switching device 32 a logical one (1) appears at the a input of NAND gate 42 which in combination with the already existing logical one (1) at the b input of NAND gate 42 causes the output c of NAND gate 42 to make a logical one (1) to logical zero (0) transition. This logical zero (0) at output c of NAND gate 42 is transmitted to the a input of NAND gate 44 thereby causing the output c of NAND gate 44 to make a logical zero (0) to logical one (1) transition. The logical one (1) output c of NAND gate 44 is transmitted back to the a input of NAND gate 42 thereby latching control system 10 in another operational mode.

Since the output c of NAND gate 42 is electrically coupled to the base of transistor 72, transistor 72 will be activated thereby activating machine function 102 of the apparatus. Furthermore, upon activation of transistor 72, a logical one (1) signal is transmitted through diode 59 to the a input of NAND gate 48 thereby assuring that a logical zero (0) appears at the output c of NAND gate 48 which maintains the constant operation of machine function 106. Accordingly, during this second operational mode of control system 10, machine function 102 is activated while machine function 106 continues to operate.

The transistor 72 of function control means 70 further upon activation supplies a signal to timing means 110 which charges capacitor 122 to ⅔ of the regulated DC voltage of DC power supply 20 in a time determined by the RC time constant associated with resistor 130 and capacitor 122. A time period required for capacitor 122 to charge to ⅔ the regulated DC voltage determines a timing cycle for the operation of machine function 102. During this timing cycle, the output 123 of timing circuit 120 will be a logical one (1) and upon reaching the ⅔ of the regulated DC voltage the output 123 will be driven to a logical zero (0) state. This logical zero (0) is transmitted back to the a input of NAND gate 42 thereby changing the a input from a logical one (1) to a logical zero (0). This will cause the output c of NAND gate 42 to make a logical zero (0) to logical one (1) transition thereby unlatching the control circuit 10 from the second operational mode and resulting in deactivation of machine function 102. At this point, control system 10 reverts to and latches in the first operational mode as described above and machine function 106 continues to operate.

A third operational mode of control system 10 is programmed when momentary switching device 34 is actuated. Upon actuation of momentary switching device 34 a logical one (1) appears at the a input of NAND gate 46. This results in the output c of NAND gate 46 making a logical one (1) to logical zero (0) transition. The logical zero (0) output c of NAND gate 46 is transmitted to the a input of NAND gate 48 thereby resulting in a logical zero (0) to logical one (1) transition of the output c of NAND gate 48. The logical one (1) output c of NAND gate 48 is transmitted back to the a input of NAND gate 46 whereby gate circuit means 40 latches control system 10 in a third operational mode. Since the output c of NAND gate 46 is electrically coupled to the base of transistor 82, the logical zero (0) output c of NAND gate 46 will activate transistor 82 thereby activating machine function 104. Since the output c of NAND gate 48 is electrically coupled to the base of transistor 92, the logical one (1) output c of NAND gate 48 will deactivate transistor 92 thereby deactivating machine function 106. The activation of transistor 82 provides a signal to timing means 110 whereby a timing cycle is determined for the operation of machine function 104 in the manner previously described for machine function 102. In this instance, the timing cycle is determined by the RC time constant associated with resistor 134 and capacitor 122. Again, as soon as capacitor 122 has charge to a voltage which is ⅔ the DC regulated voltage of DC power supply 20, the output 123 of timing circuit 120 will be driven to a logical zero (0) state and that logical zero (0) will be transmitted to the a input of NAND gate 46. Accordingly, the output c of NAND gate 46 will make a logical zero (0) to logical one (1) transition and the output c of NAND gate 48 will make a logical one (1) to logical zero (0) transition thereby unlatching the third operational mode of control system 10. In accordance with these two logical transitions of the outputs c of NAND gates 46 and 48, machine function 104 will be deactivated and machine function 106 will be reactivated. At this point, control system 10 reverts to and latches in the first operational mode as previously described hereinabove. As can be seen, during the third operational mode of control system 10 machine function 106 remains inoperative for a period of time equal to the timing cycle associated with the operation of machine function 104. Furthermore, because the outputs c of NAND gates 46 and 48 never assume the same logical states, it is impossible for machine function 104 and 106 to be operating synchronously.

In view of the above description it will be seen that the several objects of the invention are achieved and other advantageous results attained and that further modifications can be made without departing from the spirit and scope of the invention as defined in the appended claims.

What I claim is:

1. In an apparatus having a plurality of machine functions and a control system for controlling activation and deactivation of said machine functions, said control system including programming means having N momentary switching devices for programming desired operational modes of said apparatus and function control means for activating and deactivating said machine functions in accordance with predetermined operational sequences associated with said operational modes, the improvement wherein said control system further comprises: gate circuit means responsive to said N momentary switching devices for latching said control system in at least N+1 operational modes, said gate circuit means including at least two bistable multivibrator circuits and each of said bistable multivibrator circuits includes a plurality of multiple input inverting logic gates each having an output electrically coupled to an input of at least one other of said logic gates, at least N of said inverting logic gates have inuts electrically coupled to said momentary switching devices whereby activating any one of said N momentary switching devices causes at least one of said inverting logic gates to make a logical one (1) to logical zero (0) transition and at least another of said inverting logic gates to make a logical zero (0) to logical one (1) transition thereby latching said control system in at least one of said N+1 operational modes, said function control means responsive to said gate circuit means whereby said machine functions are activated and deactivated in accordance with said predetermined operational sequences, and timing means responsive to said function control means for determining timing cycles for operational sequences of at least N of said N+1 operational modes.

2. The improved control system as recited in claim 1 wherein at least one of said inverting logic gates of one of said bistable multivibrator circuits has an output electrically coupled to at least one machine function and said two inverting logic gates of another of said bistable multivibrator circuits each has an output electrically coupled to at least two other machine functions whereby said two other machine functions are activated and deactivated asynchronously.

3. The improved control system as recited in claim 2 wherein a first machine function of said two other machine functions is activated and a second machine function of said two other machine functions is deactivated by actuating one of said N momentary switching devices for a timing cycle determined by said timing means; otherwise, said second machine function operates continuously.

4. The improved control system as recited in claim 3 wherein said gate circuit means further includes means responsive to said functioncontrol means for assuring that said first machine function of said other two machine functions is deactivated and said second machine function of said other two machine functions is continuously operating when said one machine function is activated.

5. The improved control system as recited in claim 4 wherein an output of said timing means is electrically coupled to each of said inputs of said multiple input inverting logic gates which are electrically coupled to said N momentary switching devices and said output of said timing means makes a logical one (1) to logical zero (0) transition upon conclusion of a timing cycle thereby unlatching said gate circuit means.

* * * * *